(12) United States Patent
Viduya et al.

(10) Patent No.: US 6,408,974 B1
(45) Date of Patent: Jun. 25, 2002

(54) COMPONENT MOUNT FOR A VEHICLE FRAME

(75) Inventors: Jesus D. Viduya, Fort Wayne; William G. Pollack, Jr., Auburn; Ronald C. Schroeder; Scott A. Wooldridge, both of Fort Wayne, all of IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/591,824

(22) Filed: Jun. 12, 2000

Related U.S. Application Data

(60) Provisional application No. 60/138,837, filed on Jun. 10, 1999.

(51) Int. Cl.[7] .............................................. B62D 21/00
(52) U.S. Cl. ........................ 180/312; 29/897.2; 29/469; 180/377; 248/678
(58) Field of Search .............................. 29/281.1, 281.4, 29/281.5, 700, 897.2, 466, 469, 525.01, 525.02, 525.11; 248/678; 180/312, 311, 377

(56) References Cited

U.S. PATENT DOCUMENTS

| | | | | |
|---|---|---|---|---|
| 1,336,008 A | * | 4/1920 | Whitten | |
| 1,698,453 A | * | 1/1929 | Sardeson et al. | |
| 3,236,326 A | * | 2/1966 | Reynolds | |
| 3,353,771 A | * | 11/1967 | Bow | |
| 4,402,380 A | * | 9/1983 | Strong | |
| 5,174,541 A | * | 12/1992 | Hutter et al. | |
| 5,193,642 A | * | 3/1993 | Miyake | |
| 5,454,453 A | * | 10/1995 | Meyer et al. | |
| 5,593,001 A | * | 1/1997 | Takano et al. | |
| 5,851,007 A | * | 12/1998 | Swartzlander et al. | |
| 6,223,850 B1 | * | 5/2001 | Rajca et al. | |
| 6,269,902 B1 | * | 8/2001 | Miyagawa | |

* cited by examiner

Primary Examiner—S. Thomas Hughes
Assistant Examiner—T. Nguyen
(74) Attorney, Agent, or Firm—Jeffrey P. Calfa; Neil T. Powell; Dennis Kelly Sullivan

(57) ABSTRACT

A mount for securing a component, such as an engine, to a vehicle frame. Preferably, the mount includes a bottom and top isolator and a cross member that can be assembled and secured to the engine at an assembly station away from the primary assembly line. The cross member includes frame mounting surfaces that are vertically oriented at each side of the cross member, and the frame includes corresponding engine mounting surfaces. A receiver with a downward facing surface is also provided that is attached to the cross member. A stop support that is attached to the vehicle frame supports the weight of the engine with an upward facing support surface that abuts the receiver support surface.

13 Claims, 2 Drawing Sheets

COMPONENT MOUNT FOR A VEHICLE FRAME

RELATED APPLICATION

This application claims the benefit of U.S. Provisional Application No. 60/138,837 filed Jun. 10, 1999, which application is incorporated herein in its entirety.

FIELD OF THE INVENTION

The present invention relates generally to automotive vehicles, and more particularly, to an apparatus for mounting components to the vehicle frame.

BACKGROUND

Typically, automotive vehicles include a frame, also referred to as a chassis, which provides the primary structural support for the vehicle. The major components of the vehicle, such as the engine, transmission, and operator station, are then mounted directly to the frame.

In the situation of mounting the engine to the frame, several considerations are particularly important in designing the mounting apparatus. First, the engine mounts usually include elastomer isolators to absorb vibrations that originate from the engine and vibrations that are caused by the vehicle traveling over the ground. The engine mounts also need to position the engine accurately in relation to the frame and the other vehicle components in order to maximize the operating life of the vehicle's drive system. In addition, the engine mounts should be simple and fast to assemble so that labor costs to manufacture the vehicle can be minimized.

Engine mounts that allow the engine to be quickly secured to the frame are especially important in modem manufacturing processes. In the typical manufacturing process, the major components of the vehicle are subassembled away from each other at different locations. Commonly, the manufacturer of the vehicle will purchase each of the major components from different suppliers. The manufacturer then mounts each of the components to the vehicle frame at a primary vehicle assembly line that is usually precisely designed to maximize the quantity of the vehicles that can be produced and the speed of their production. Thus, the assembly line is designed to move quickly through a number of successive assembly stations, with each operator relying on the previous operators to timely finish their work. However, the area around the primary assembly line often becomes congested with assembly equipment, vehicle components, and assembly operators; and as a result, the speed of the assembly line is limited.

Current engine mounts are not well-suited for the speed required in these modem manufacturing processes. Traditionally, the engine is mounted to the frame by lifting the engine on a hoist above the primary assembly line and the vehicle frame. The engine is then lowered down into the frame until the engine is near its final installation position. While the engine is still supported by the hoist, an assembly operator must then crawl under the vehicle frame to position and install the mounting hardware. Once the mounting hardware is installed, the engine is completely lowered onto the engine mounts; and the operator, who, is still underneath the frame, secures the engine to the frame by installing nuts and washers upward into them hardware.

However, this assembly procedure is time-consuming and difficult. As a result, the primary assembly line must move slower to provide extra time for the operator working under the frame. The current engine mounts also make it difficult to accurately position the engine in relation to the frame and the other components, which can reduce the operating life of the engine and other components.

One problem that is especially troublesome is imprecise positioning of the isolators, which can reduce the operating life and the effectiveness of the isolators. As a result, the operating life of the engine can be shortened and vehicle drivers can become dissatisfied when extra engine vibrations are transmitted to the frame. Typically, the isolators include a top isolator and bottom isolator at each corner of the engine. In order to maximize the life and effectiveness of the isolators, each of these isolators must be accurately aligned in both a side-to-side position and a fore-aft position. However, when an isolator is misaligned from its proper position, the forces applied to the isolator from the engine and the frame become concentrated on a particular area of the isolator instead of across the entire surface of the isolator. This causes the area where the concentrated force is applied to wear out sooner than the design life of the isolator. In addition, the expected damping characteristics of the isolator change when only part of the isolator is loaded.

Another problem with current engine mounts is that they require the radiator to be installed after the engine is mounted to the frame. The radiator is typically attached to the front end of the engine. Therefore, once the radiator is secured to the engine, access to the front engine mounts is obstructed. This disadvantage prevents the manufacturer from testing the engine for defects, with the radiator installed before the engine is installed in the frame. As a result, some defects in the engine and the radiator are not discovered until the vehicle is fully assembled, which makes repair work much more expensive.

Although these problems are particularly notable in regards to mounting the engine to the frame, similar problems also occur when mounting other major components to the frame.

BRIEF SUMMARY OF THE INVENTION

Accordingly, a mount is provided for quickly and easily securing a component to a vehicle frame. The mount also provides accurate positioning of the component in relation to the frame and the other major components. In addition, the invention allows a bottom and top isolator to be precisely positioned away from the primary assembly line. The primary assembly line is also able to run faster with the improved mount because an assembly operator is no longer required to crawl under the frame during installation of the component at the primary assembly line.

A receiver and a stop support are provided, with the receiver being attached to a cross member and the stop support being attached to the frame. The receiver is a slot with an open bottom end, and the stop support extends inward towards the component. Therefore, the stop support supports the weight of the component when the component is lowered into the frame and the receiver abuts the stop support. Vertically oriented frame mounting surfaces are also attached to the cross support, and corresponding engine mounting surfaces are attached to the frame. Thus, the cross support is secured to the frame with screws that extend horizontally through the frame, the engine mounting surfaces, and the frame mounting surfaces.

BRIEF DESCRIPTION OF SEVERAL VIEWS OF THE DRAWINGS

The invention, including its construction and method of operation, is illustrated more or less diagrammatically in the drawings, in which.

DETAILED DESCRIPTION OF THE INVENTION

Figure 1:
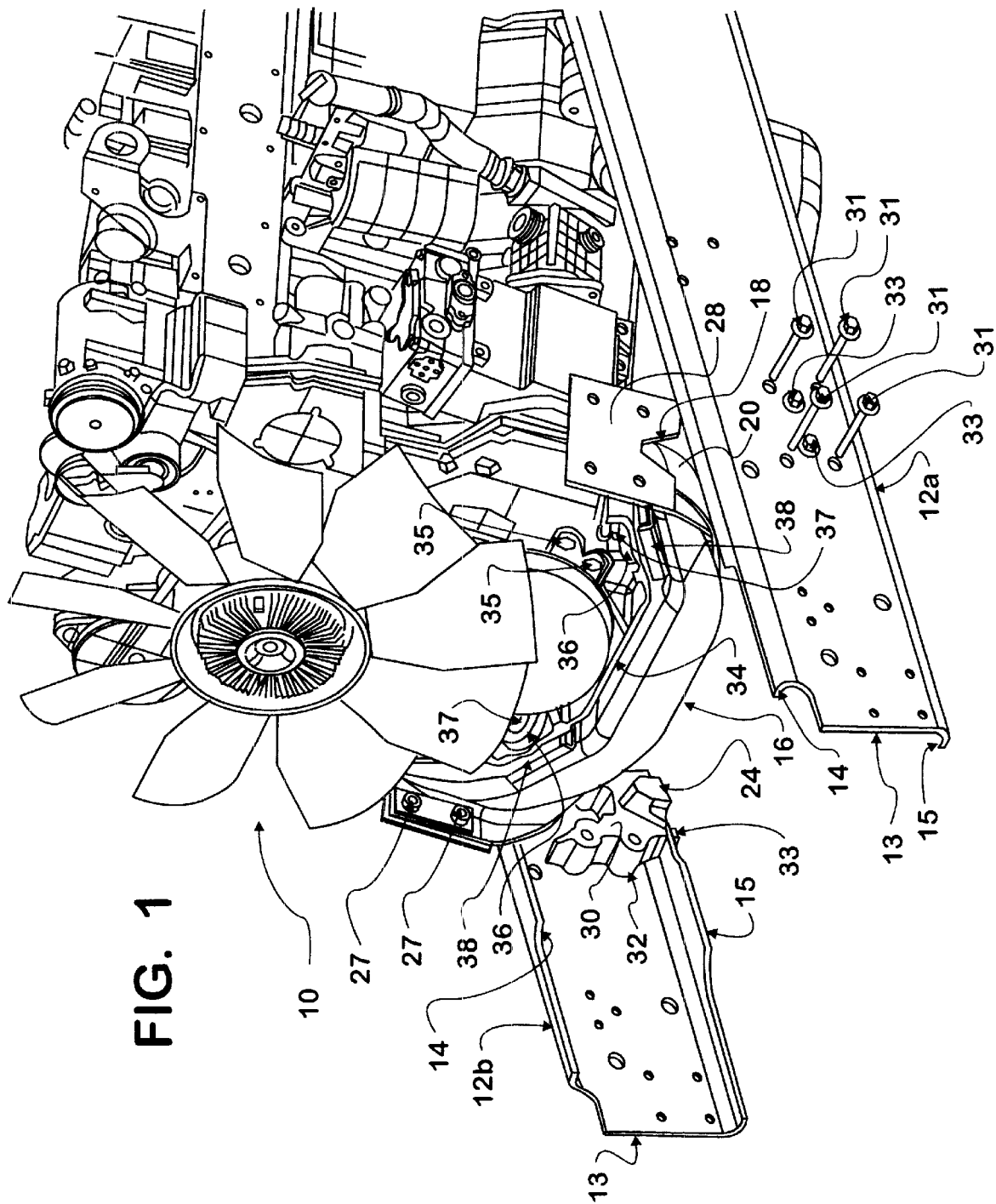
FIG. 1 is a perspective view of an engine being mounted to a frame.

Turning now to the drawings, there is shown an engine 10 and a vehicle frame 12. The engine 10 is mounted to the frame 12 by an apparatus that provides fast and easy mounting, while assuring accurate positioning of the engine 10 and the isolators 36, 38. The frame 12 includes a left portion 12a and a right portion 12b. Although similar vehicle frames are used in many types of automotive vehicles, a truck frame is shown in the drawings. The frame portions 12 may be formed in several different shapes, but preferably the frame portions 12 are made from steel and are channel-shaped, with a side wall 13, an upper ledge 14, and a lower ledge 15. As is well-known in the art, the frame 12 provides the primary structural support for the vehicle. Accordingly, a variety of different components are mounted directly to the frame 12, such as the engine 10, transmission, operator's station, and other major components. Therefore, as shown in FIG. 1, the engine 10 is mounted to the frame 12 by lowering the engine 10 down between the left 12a and right 12b frame portions and securing the engine 10 to each of the frame portions 12.

Figure 2:
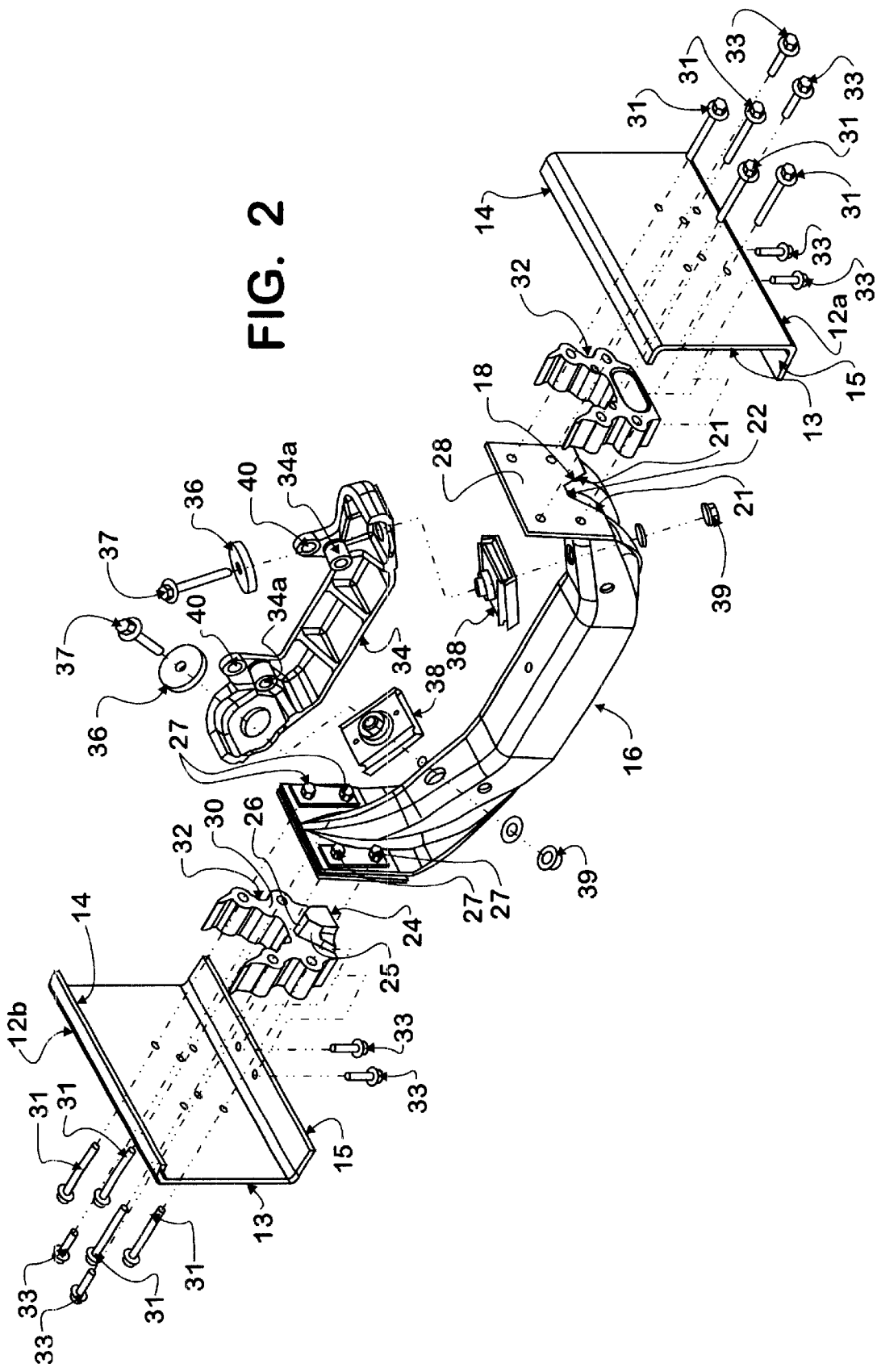
FIG. 2 is an exploded view of an engine mounting apparatus.

Turning generally to FIG. 2, the cross member 16 includes a receiver 18 on each end side of the cross member 16, and the spacers 32 each include a corresponding stop support 24. The receivers 18 form slots through the cross member 16 with bottom of each receiver 18 having an open end 20 to receive one of the stop supports 24 (see FIG. 1). The sides and the top of the receivers 18 form support surfaces 21, 22 that face downward. To ease assembly of the receivers 18 onto the stop supports 24, the side support surfaces 21 are angled outward in an inverted V-shape, while the top support surfaces 22 are oriented horizontally to provide solid resting pads. Correspondingly, the stop supports 24 include supporting surfaces 25, 26 that face upward, with the side supporting surfaces 25 angled outward and the top supporting surfaces 26 oriented horizontally. The stop supports 24 extend inward toward the engine so that when the receivers 18 are installed onto the stop supports 24, the support surfaces 21, 22, 25, 26 rest against each other, thus supporting the weight of the engine 10.

The cross member 16 also includes a vertically oriented frame mounting surface 28 on each side of the cross member 16. Correspondingly, each of the spacers 32 include a vertically oriented engine mounting surface 30. Preferably, the frame mounting surfaces 28 are integrated with the receivers 18 and the engine mounting surfaces 30 are integrated with the stop supports 24 so that each receiver 18 forms a slot through one of the frame mounting surfaces 28 and each stop support 24 extends inward from one of the engine mounting surfaces 30. In order to provide clearance for the cross member 16 as it is dropped down through the left 12a and right 12b frame portions, the thickness of each of the spacers 32 is greater than the depth of the corresponding upper ledges 14. The spacers 32 can then be easily secured to the frame portions 12 by resting the bottom of the spacers 32 on the corresponding lower ledges 15 and installing two screws 33 up through holes in the lower ledges 15 into the bottom of each spacer 32 and installing two screws through holes in the side walls 13 into the side of each spacer 32. Accordingly, the distance between the two frame mounting surfaces 28 at each side of the cross member 16 is approximately equal to the distance between the engine mounting surfaces 30 of the two spacers 32. Consequently, the width of the cross member 16 is less than the distance between the two upper ledges 14, thus providing unobstructed clearance for the cross member 16. Each of the frame mounting surfaces 28 can then be secured against the corresponding engine mounting surfaces 30 with four screws 31 that extend through holes in the side walls 13, the spacers 32, and the frame mounting surfaces 28. Threaded nuts 27 are welded to the inside of the cross member 16 in order to receive the screws 31.

The engine 10 is mounted to the cross member 16 through top 36 and bottom 38 isolators. The isolators 36, 38 are elastomer members that minimize the transmission of engine 10 vibrations to the frame 12 and the transmission of frame 12 vibrations caused by vehicle travel to the engine 10. Accordingly, bottom isolators 38 are installed between the top side of the connecting member 16 and the bottom side of the engine mount 34. Thus, the bottom isolator 38 absorbs vibrations that force the engine 10 downward or force the frame 12 upward by being compressed between the connecting member 16 and the engine mount 34. The top isolators 36 are installed between the top side of the engine mount 34 and the head of respective isolator screws 37, or retainers. Thus, the top isolator 36 absorbs vibrations that force the engine 10 upward or force the frame 12 downward by being compressed between the engine mount 34 and the screw 37 heads. The engine mount 34 and the isolators 36, 38 are secured to the connecting member 16 by two screws 37 that extend through holes in the isolators 36, 38, the engine mount 34, and the connecting member 16. The desired preload in the isolators 36, 38 is applied by tightening the nuts 39 onto the screws 37 to a predetermined torque. The engine 10 is secured to the engine mount 34 by screws 35 that extend through holes 40 in the engine mount 34 and are threaded directly into the engine 10.

One advantage of the invention is that the connecting member 16 and the isolators 36, 38 can be attached to the engine 10 away from the primary vehicle assembly line. This allows the operators to spend more time installing the isolators 36, 38 in order to assure precise and accurate positioning of the isolators 36, 38. In this separate assembly station, the operators also have easier and more open access to the isolators 36, 38 and the other components than is possible on the primary assembly line, where the vehicle frame portions 12 and other obstructions inhibit access.

Another advantage of assembling the isolators 36, 38 and the connecting member 16 in a separate station is that additional components can be installed onto the engine 10 at the separate assembly station. One notable example is the radiator. Normally, the radiator must be attached to the engine after the engine 10 is mounted to the frame 12 because the installation of the radiator prevents access to the isolators 36, 38 and the isolator screws 37 and engine screws 35. However, the invention allows the radiator to be attached to the engine 10 in the separate assembly line after the connecting member 16 is installed onto the engine 10. This' allows the primary assembly line to run faster because the radiator no longer needs to be installed at the primary assembly line. More importantly though, installation of the radiator at the separate assembly station also allows coolant fluid to be dispensed into the radiator and the engine 10 at the separate assembly station, thus permitting the operators to run the engine 10 and test for defects before installing the engine 10 into a vehicle.

The invention also allows the engine 10 to be installed into the frame 12 faster at the primary assembly line than is possible with traditional mounts, thus increasing production capacity and lowering labor costs. One significant advantage is that the invention does not require an operator to crawl under the frame 12 at the primary assembly line while installing the engine 10 in the frame 12. The invention also results in a more accurate position of the installed engine 10 in relation to the frame 12 and the other components. This more accurate positioning improves the operating life of the engine 10 and the connected components, such as the transmission, by minimizing undesirable misalignments between the drive systems. The connection between the receivers 18 and stop supports 24 along with the attachment of the frame mounting surfaces 28 to the engine mounting surfaces 30 by the frame bolts also provides a solid and rigid connection to the frame 12 that resists torsional forces during operation of the vehicle. Likewise, the cross member 16 provides additional rigidity to the frame 12.

Although the invention has been described as mounting an engine to a frame, it is contemplated that the invention could also be used to mount other vehicle components to a frame, such as the transmission, an operator's station, or other vehicle components. According to the preferred embodiment of mounting an engine 10 to the frame 12, the apparatus is preferably assembled as follows. First, the engine mount 34, isolators 36, 38, and cross member 16 are assembled together with the isolator bolts 37 and nuts 39 in a separate assembly station. This allows easy and accurate installation of the isolators 36, 38. Next, the engine mount 34 is attached directly to the engine 10 with the engine bolts 35. Other components that may obstruct access to the isolators 36, 38 and the isolator bolts 37 and engine bolts 35 can then be installed onto the engine 10. Moving then to a primary vehicle assembly line, the spacers 32 are attached to each of the lower ledges 15 and side walls 13 of the frame portions 12 with the spacer bolts 33. The engine 10 can then be lowered down between the frame portions 12 by a hoist. Preferably, the rear end of the engine 10 is lowered down first so that the rear of the engine 10 rests upon a pair of rear engine mounts (not shown). Rear engine mounts like that disclosed in U.S. Pat. No. 5,242,146 are preferable. The front of the engine 10 is then rotated downward until the stop supports 24 enter the open end 20 of the receivers 18 and the receiver support surfaces 21, 22 abut against the stop support surfaces 25, 26. The holes in the frame mounting surfaces 28 will then be aligned with the holes in the spacers 32 and the side walls 13 of the frame portions 12. The frame bolts 31 are then installed to secure the connecting member 16 to the frame 12.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. An apparatus for mounting a component to a vehicle frame, comprising: a frame mounting surface attached to said component, said frame mounting surface being oriented generally vertical; a receiver attached to said component, said receiver having a support surface facing generally downward; a component mounting surface attached to said frame, said component mounting surface being oriented generally vertical; a stop support attached to said frame, said stop support having a support surface facing generally upward; wherein said receiver support surface and said stop support surface abut each other, thereby supporting the weight of said component; wherein said frame mounting surface and said component mounting surface are secured against each other when said receiver support surface and said stop support surface abut; wherein said receiver is a slot with an open bottom end, said receiver support surface including a top support surface oriented generally horizontal and side support surfaces angled outward from the top support surface; and wherein said stop support extends from said frame, said stop support surface including a top support surface oriented generally horizontal and side support surfaces angled outward from the top support surface.

2. The apparatus according to claim 1, further comprising a cross support member having two of said frame support surfaces disposed at opposite sides of the cross member; said frame having two spaced apart portions with one of said component mounting surface disposed along each portion; and wherein said cross support member is attached to said component.

3. The apparatus according to claim 2, wherein said component is an engine.

4. The apparatus according to claim 2, wherein said receiver includes two of said receivers, said receivers being integral with said frame mounting surfaces thereby forming slots through said frame mounting surfaces; and said stop support includes two of said stop supports, said stop supports being integral with said component mounting surfaces thereby extending inward from said component mounting surfaces towards said component.

5. The apparatus according to claim 2, wherein said frame portions are channel-shaped with each portion having a top ledge and a bottom ledge extending inward from a side wall toward said component; and said component mounting surfaces are disposed on two spacers with one spacer abutting each of said bottom ledges and said side walls, each of said spacers being thicker than each of said top ledges.

6. The apparatus according to claim 5, wherein said frame mounting surfaces are secured against said corresponding component mounting surfaces by screws that extend generally horizontal through holes in said side walls of said frame and holes in said spacers and are threaded into holes in said cross member.

7. The apparatus according to claim 2, further comprising a top isolator and a bottom isolator made from an elastomer material, wherein said bottom isolator is disposed between a top side of said cross member and a bottom side of a component mount attached to said component and said top isolator is disposed between a top side of said component mount and a bottom side of a retainer.

8. The apparatus according to claim 7, wherein said top isolator and said bottom isolator includes two sets of isolators with each set being disposed at opposite sides of said cross member.

9. The apparatus according to claim 7, wherein said component mount is a separate member from said component and is fixedly secured to said component.

10. The apparatus according to claim 3, wherein said receiver includes two of said receivers, said receivers being integral with said frame mounting surfaces thereby forming slots through said frame mounting surfaces; and said stop support includes two of said stop supports, said stop supports being integral with said component mounting surfaces thereby extending inward from said component mounting surfaces towards said component.

11. The apparatus according to claim 10, wherein said frame portions are channel-shaped with each portion having a top ledge and a bottom ledge extending inward from a side wall toward said component; said component mounting surfaces are disposed on two spacers with one spacer abutting each of said bottom ledges and said side walls, each of said spacers being thicker than each of said top ledges; and said frame mounting surfaces are secured against said corresponding component mounting surfaces by screws that extend generally horizontal through holes in said side walls of said frame and holes in said spacers and are threaded into holes in said cross member.

12. The apparatus according to claim 11, further comprising a top isolator and a bottom isolator made from an elastomer material, wherein said bottom isolator is disposed between a top side of said cross member and a bottom side of a component mount attached to said component and said top isolator is disposed between a top side of said component mount and a bottom side of a retainer.

13. The apparatus according to claim 12, wherein said top isolator and said bottom isolator includes two sets of isolators with each set being disposed at opposite sides of said cross member; and said component mount is a separate member from said component and is fixedly secured to said component.

* * * * *